United States Patent [19]
Gross

[11] Patent Number: 5,139,830
[45] Date of Patent: Aug. 18, 1992

[54] DECORATIVE MOLDING

[75] Inventor: Michael G. Gross, Tipp City, Ohio

[73] Assignee: Creative Extruded Products, Inc., Tipp City, Ohio

[21] Appl. No.: 540,764

[22] Filed: Jun. 20, 1990

[51] Int. Cl.⁵ .......................................... B60R 13/04
[52] U.S. Cl. ...................................... 428/31; 52/716; 293/128; 428/40; 428/67
[58] Field of Search ............... 428/31, 67, 40; 52/716; 293/128

[56] References Cited

U.S. PATENT DOCUMENTS

| | | | |
|---|---|---|---|
| 1,777,309 | 10/1930 | Hopkinson | 428/251 X |
| 3,133,854 | 5/1964 | Simms | 428/421 |
| 4,235,949 | 11/1980 | Van Manen et al. | 428/31 |
| 4,337,296 | 6/1982 | Vardhachary | 428/423.3 X |
| 4,349,592 | 9/1982 | Nussbaum | 428/31 |
| 4,497,678 | 2/1985 | Nussbaum | 428/31 X |
| 4,617,209 | 10/1986 | Ives | 428/31 |
| 4,671,974 | 6/1987 | Murachi | 428/31 |
| 4,722,818 | 2/1988 | Zoller | 428/31 X |
| 4,759,982 | 7/1988 | Jenssen et al. | 428/31 |
| 4,763,397 | 8/1988 | Tsukayama et al. | 428/31 X |
| 4,965,103 | 10/1990 | Roberts et al. | 428/31 |

FOREIGN PATENT DOCUMENTS

| | | | |
|---|---|---|---|
| 929984 | 7/1973 | Canada | 428/31 |
| 62-176058 | 11/1987 | Japan | 428/31 |

*Primary Examiner*—Henry F. Epstein
*Attorney, Agent, or Firm*—Reuben Wolk

[57] ABSTRACT

A decorative molding for automobiles, providing decorative trim therefor. The molding comprises a first member of polymeric material, a portion of the member being wrapped with a decorative covering of metallized plastic material and the remaining portion of the member covered with a second member of similar polymeric material to encapsulate and protect the ends of the covering. The molding is preferably formed by extruding the first member, wrapping the decorative covering in the form of a strip around a portion of the first member, and extruding the encapsulating member around an uncovered portion of the first member. It is also contemplated that a stabilizing strip be incorporated within the first member by feeding it into the extruder which forms the first member.

9 Claims, 2 Drawing Sheets

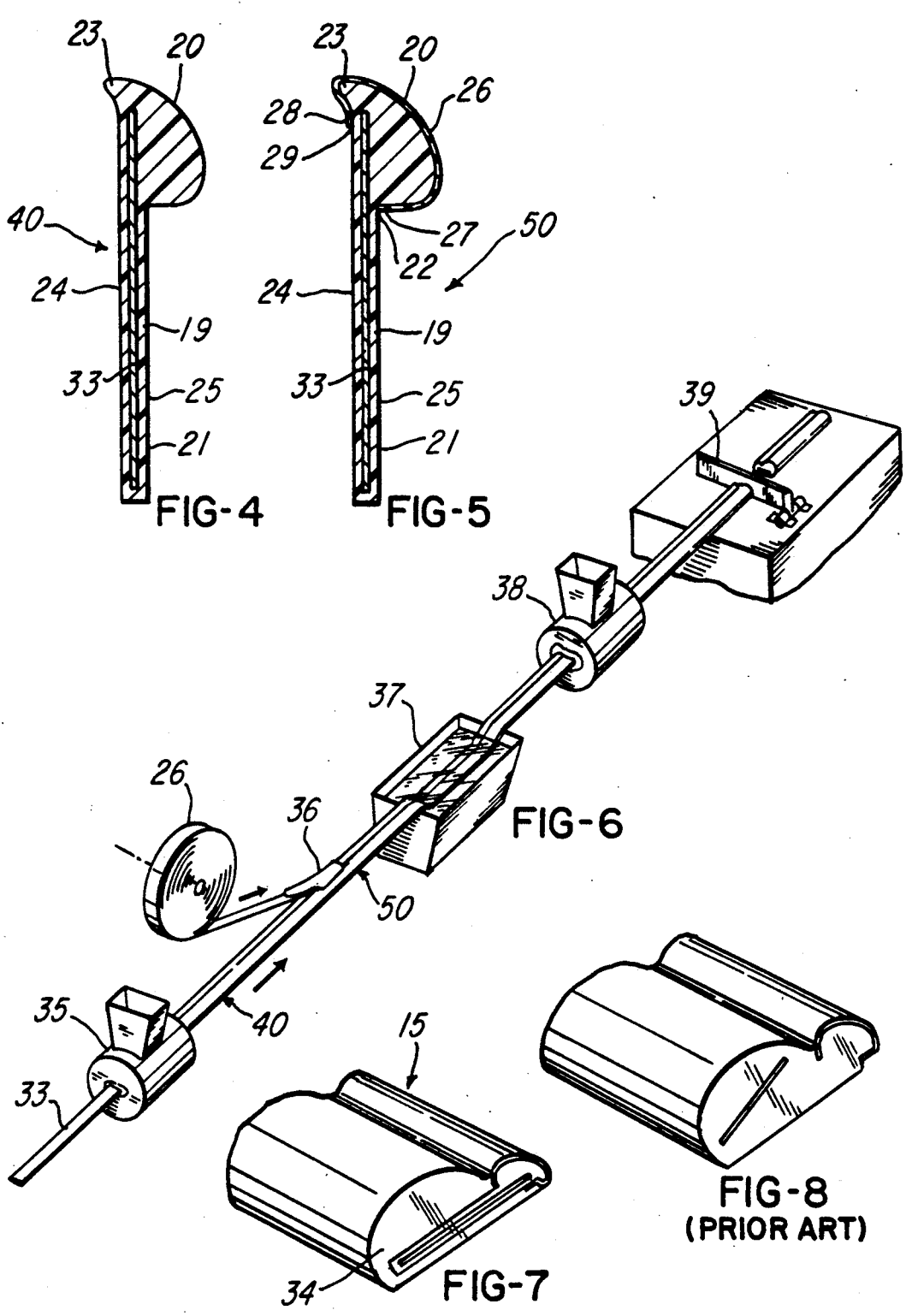

DECORATIVE MOLDING

BACKGROUND OF THE INVENTION

The present invention relates to a decorative molding which may be applied as a body side molding or a bumper fascia molding for automobiles, or decorative trim for household appliances such as refrigerators.

PRIOR ART STATEMENT

It is known to form decorative molding of the type set forth in the present invention, such as shown in FIGS. 3 and 8, wherein a polymeric material is formed with a metal stabilizer imbedded in the center of the mass to provide length control. In this type of molding, a decorative covering of plastic material is then applied over part of the material. However, in such a construction at least one end of the covering is exposed to the elements.

SUMMARY OF THE INVENTION

The present invention represents an important improvement over a prior art molding of the type referred to above, by providing a construction which provides more through protection of the decorative covering. This is accomplished by forming a first polymeric member, wrapping a portion of it with a decorative covering, and forming a second polymeric member which imbeds part of the first member and encapsulates the ends of the decorative covering to protect them from loss of structural integrity, such as by delamination or tearing. The invention also provides for incorporating a stabilizing means within the first member, thus maintaining the stabilizing means in constant aligned relationship within the molding and providing length control.

Accordingly, it is a principal object of the invention to provide an improved decorative molding having a decorative covering over a portion thereof.

It is another object to provide such a molding for automobile side bodies, bumper fascia, and household appliances such as refrigerators.

It is another object to provide means for sealing the ends of the decorative covering to prevent loss of structural integrity.

It is further object to provide improved means for stabilizing and reinforcing the body.

It is a further object to provide a method of making the molding in a quick, simple, and inexpensive manner.

These and other details and features of the invention will become more readily apparent from the preferred embodiment described and shown herein.

BRIEF DESCRIPTION OF THE DRAWINGS

FIG. 4 is a sectional view of a subassembly of a first member incorporating a stabilizer.

FIG. 5 is a sectional view of a further subassembly of the FIG. 4 subassembly with the decorative covering applied.

FIG. 6 is a schematic view of an exemplary method of forming the novel molding incorporating a stabilizer.

FIG. 7 is a perspective view of a finished molding of the present invention, illustrating the beveled end of the molding.

FIG. 8 is a view similar to FIG. 7 illustrating the beveled end of the prior art device of FIG. 3.

DESCRIPTION OF A TYPICAL EMBODIMENT

Figure 1:
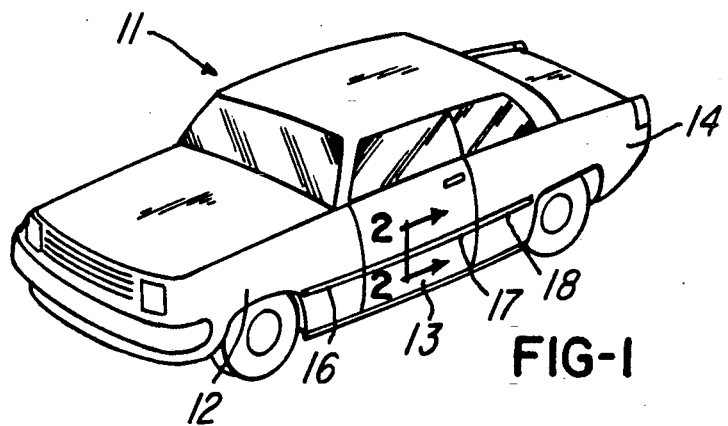
FIG. 1 is a perspective view of a typical automobile on which one form of the novel decorative molding is mounted for use as a body side molding.

Referring now to the drawings, FIG. 1 illustrates an automobile 11, having a side comprising a front fender panel 12, a door 13, and a rear fender panel 14. The novel decorative molding, generally designated by reference number 15, is composed of separate segments 16, 17, and 18 secured to the door and the two fender panels by means of an adhesive, as is well known in the art. Such an installation is referred to in the trade as a body side molding, and is typical of one use of the novel molding. As discussed above, the molding may also be utilized in the area of the bumper, referred to as bumper fascia; or may be applied to a household appliance, such as a refrigerator.

Figure 2:
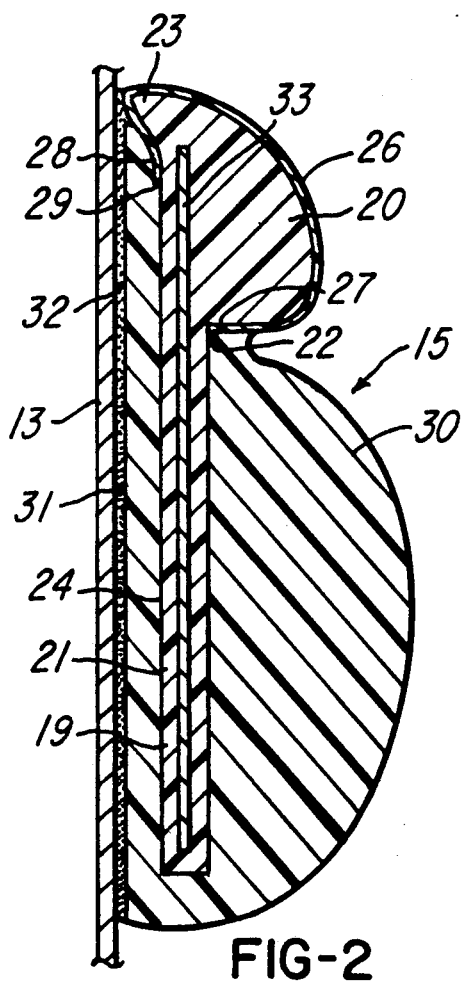
FIG. 2 is a sectional view of a portion of the molding of FIG. 1 taken along lines 2—2 of FIG. 1.

As shown in FIG. 2, the molding 15 is principally composed of a polymeric material such as polyvinyl chloride, polyethylene or polypropylene, and may be made in a number of different configurations in accordance with the requirements of the automobile designer. The typical molding of FIG. 2 has a planar surface and a non-planar surface and comprises a separate member 19 of a similar polymeric material, having a portion 21 which is generally rectangular in cross-section and having lower and upper planar surfaces 24 and 25, with a raised portion 20 at one end of the member 19 which is generally semi-circular in cross-section and extends outward of the first portion in a direction approximately at right angles to the planar surface. Portion 20 intersects the portion 19 at line 22. The outer end 23 of the raised portion extends below the lower surface 24 of member 19. A stabilizer 33, made of a strip of metal such as aluminum is imbedded in the member 19 and is generally parallel thereto and also extends partially into the portion 20, and is thus completely imbedded within both portions. The stabilizer is in the same plane throughout, and reinforces the molding to provide length control.

A decorative strip is wrapped around portion 20 and the end 23 to form a decorative covering 26 around that portion, having one end 27 of the covering terminating at intersection line 22, and another end 28 on the lower surface 24 and intersecting at line 29. The strip 26 is preferably a laminated shiny metallized plastic, and may be formed of layers of polyvinyl chloride and material identified by Dupont trademarks "Mylar" and "Tedlar". The covering provides a contrasting decorative effect on the surface of the molding. To complete the configuration of the molding, an outer member 30, made of a polymeric material similar to member 19, extends completely around portion 21 to imbed and encapsulate it, and also encapsulates the end portions 27 and 28 of the covering 26. The second portion 20 extends partially beyond the member 30 in a direction toward the outer end 23. The principal portion of member 30 is generally semicircular in cross-section and has a bottom surface 31 which is generally parallel to the portion 21. As a final step, an adhesive 32 is applied to the lower surface of the finished molding so that it may be mounted on the side of the automobile as shown in FIG. 1. A layer of strippable tape (not shown) is placed over the exposed surface of the adhesive for storage and shipping purposes.

Figure 3:
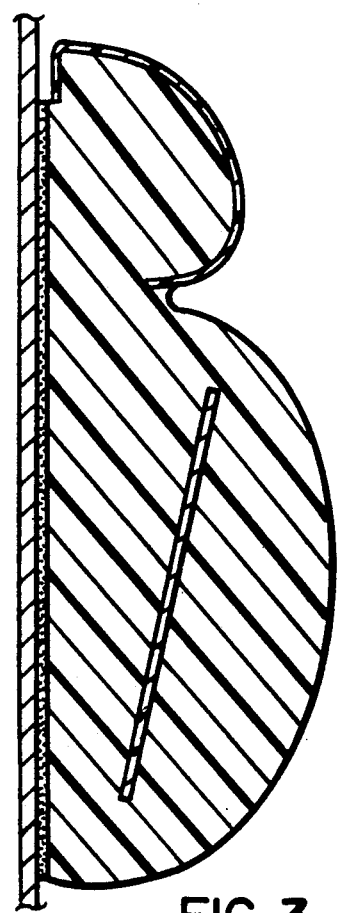
FIG. 3 is a view similar to FIG. 1 illustrating a prior art molding.

The structure thus described and shown provides several improvements over the prior art structure such as shown in FIG. 3. First of all, the ends 27 and 28 of the covering 26 are completely imbedded and protected from the elements, thus preventing delamination which might occur. Although the prior art device does protect the upper end, it does not protect the lower left hand segment, which is then subject to the delamination or other loss of structural integrity.

Another important feature is the location of stabilizer 33, which is approximately parallel to the planar surfaces of portion 21 and to the bottom planar surface 31 of the outer portion 30. This permits superior length control of the molding. In addition, extending the stabilizer into the portion 20 provides superior stability than if it were limited in its location as in the FIG. 3 structure. Another advantage of this construction is shown in FIG. 7, which illustrates a beveled edge 34 of the molding. Many of the moldings must be skived or beveled to avoid interfering with the door or another part of the vehicle. When the prior art device is beveled or skived as shown for example in FIG. 8, the cut is made through the stabilizer which therefore not only increases the complexity of the cutting, but leaves a portion of the stabilizer exposed. This is undesirable from a structural and cosmetic standpoint. By contrast, the skiving of applicant's edge in FIG. 7 permits the cut to be above the stabilizer, thus providing a cleaner appearance.

An exemplary method of manufacturing the molding is shown schematically in FIG. 6. A continuous strip of material forming the stabilizer 33 is fed into an extruder 35 in which the polymeric material forms the member 19 which is extruded over and imbeds the strip 33 to form a first subassembly 40 shown in FIG. 4. The next step consists of applying the plastic laminate 26 by feeding it from a reel of such material through a forming member 36 and wrapping it around the raised portion 20 and its end 23, terminating in ends 27 and 28. This forms the second subassembly 50 shown in FIG. 5. The subassembly is cooled by passing it through a cooling bath 37, and then passed through a second extruder 38 in which the polymeric material is extruded around and imbeds the portion 21 and covers the ends 27 and 28 of the laminate 25. The adhesive 32 is applied to the bottom surface 31 of the molding, and a strippable tape applied over the exposed surface of the adhesive. Finally a cutter 39 cuts the molding into convenient strips for storage; this cut may be straight or at an angle, or may be beveled to form the edge 34.

It should be understood that the specific construction shown and described is merely exemplary, and that other forms may be made within the spirit of the invention.

I claim:

1. A unitary decorative molding strip having a first surface adapted to be mounted on a body and an opposite exposed surface; the improvement wherein said strip comprises first and second polymeric members, said first member having first and second portions, said first portion embedded within said second member, said second member having an inner planar surface for contacting said body, said second member and said second portion of said first member each having surfaces for defining said exposed outer surface.

2. The molding strip of claim 1 wherein said first surface of said molding strip is planar and said opposite exposed surface of said molding strip is non-planar, said second portion of said first member extending outwardly of said first portion of said first member in a direction approximately at right angles to said planar surface.

3. The molding strip of claim 2 wherein said second portion of said first member extends partly beyond said second member in a direction parallel to said planar surface.

4. The molding strip of claim 2 wherein said planar surfaces of said first portion of said first member are approximately parallel to said inner planar surface of said second member.

5. The molding strip of claim 2 further comprising a reinforcing strip extending longitudinally of said molding strip and imbedded in said first member.

6. The molding strip of claim 5 wherein said reinforcing strip is completely embedded within said first and second portions of said first member.

7. The molding strip of claim 5 wherein said reinforcing strip is approximately parallel to said planar surface of said molding strip.

8. The molding strip of claim 1 including a decorative covering applied around said exposed surface of said second portion of said first member.

9. The molding strip of claim 8 wherein said decorative covering has first and second ends imbedded between said first and second members.

* * * * *